(12) United States Patent
Somani et al.

(10) Patent No.: US 10,635,432 B2
(45) Date of Patent: Apr. 28, 2020

(54) SYSTEMS AND METHODS FOR INCREMENTAL SOFTWARE DEPLOYMENT

(71) Applicant: eBay Inc., San Jose, CA (US)

(72) Inventors: Mahesh K. Somani, Milpitas, CA (US); Kumar Rethinakaleeswaran, San Jose, CA (US); Debashis Saha, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/978,491

(22) Filed: May 14, 2018

(65) Prior Publication Data

US 2018/0260210 A1 Sep. 13, 2018

Related U.S. Application Data

(63) Continuation of application No. 15/006,273, filed on Jan. 26, 2016, now Pat. No. 10,007,511, which is a continuation of application No. 13/164,380, filed on Jun. 20, 2011, now Pat. No. 9,250,866.

(51) Int. Cl.
*G06F 9/44* (2018.01)
*G06F 8/658* (2018.01)
*G06F 8/30* (2018.01)
*G06F 8/71* (2018.01)

(52) U.S. Cl.
CPC .............. *G06F 8/658* (2018.02); *G06F 8/30* (2013.01); *G06F 8/71* (2013.01)

(58) Field of Classification Search
None
See application file for complete search history.

(56) References Cited

U.S. PATENT DOCUMENTS

| 5,170,465 | A  | 12/1992 | McKeeman et al. |
| 5,182,806 | A  | 1/1993  | McKeeman et al. |
| 5,193,191 | A  | 3/1993  | McKeeman et al. |
| 5,561,800 | A  | 10/1996 | Sabatella |
| 5,758,160 | A  | 5/1998  | McInerney et al. |
| 5,848,274 | A  | 12/1998 | Hamby et al. |
| 6,052,531 | A  | 4/2000  | Waldin, Jr. et al. |
| 6,651,249 | B2 | 11/2003 | Waldin et al. |
| 6,769,114 | B2 | 7/2004  | Leung |
| 7,185,332 | B1 | 2/2007  | Waldin et al. |
| 7,287,249 | B2 | 10/2007 | Coyle et al. |

(Continued)

OTHER PUBLICATIONS

Advisory Action received for U.S. Appl. No. 15/006,273 dated Oct. 13, 2017, 3 pages.

(Continued)

*Primary Examiner* — Qamrun Nahar

(57) ABSTRACT

Methods and systems for facilitating incremental software deployment are disclosed. For example, a method can include receiving a command to deploy a second version of software to a computing system for execution on the computing system. In response to the command, differences between the second version of the software and a first version of the software being executed on the computing system are determined. Code changes to be made to the first version of the software to produce the second version of the software are determined based on the differences. The code changes to be made to the first version of the software are transmitted to the computing system.

20 Claims, 12 Drawing Sheets

(56) References Cited

U.S. PATENT DOCUMENTS

| | | | |
|---|---|---|---|
| 7,434,200 | B2 | 10/2008 | Bender |
| 7,457,817 | B2 | 11/2008 | Krishnaswamy et al. |
| 7,506,115 | B2 | 3/2009 | Xing et al. |
| 7,574,706 | B2 | 8/2009 | Meulemans et al. |
| 7,721,272 | B2 | 5/2010 | Mockford |
| 7,797,689 | B2 | 9/2010 | Mockford |
| 8,762,980 | B1 * | 6/2014 | Sobel .................. G06F 8/65 717/170 |
| 9,250,866 | B2 | 2/2016 | Somani et al. |
| 10,007,511 | B2 | 6/2018 | Somani et al. |
| 2004/0221270 | A1 * | 11/2004 | Witchel ............... G06F 8/71 717/124 |
| 2007/0234320 | A1 | 10/2007 | Gu |
| 2009/0070750 | A9 | 3/2009 | Gu |
| 2010/0242032 | A1 | 9/2010 | Ladki et al. |
| 2011/0078674 | A1 | 3/2011 | Ershov |
| 2011/0231471 | A1 * | 9/2011 | Kudikala .............. G06F 8/65 709/202 |
| 2012/0324435 | A1 | 12/2012 | Somani et al. |
| 2016/0139913 | A1 | 5/2016 | Somani et al. |

OTHER PUBLICATIONS

Final Office Action received for U.S. Appl. No. 15/006,273, dated Aug. 8, 2017, 8 pages.
Non-Final Office Action received for U.S. Appl. No. 15/006,273, dated Jan. 27, 2017, 15 pages.
Notice of Allowability received for U.S Appl. No. 15/006,273, dated Apr. 3, 2018, 2 pages.
Notice of Allowability received for U.S. Appl. No. 15/006,273, dated Mar. 12, 2018, 2 pages.
Notice of Allowance received for U.S. Appl. No. 15/006,273, dated Feb. 20, 2018, 9 pages.
Response to Final Office Action filed on Sep. 28, 2017 for U.S. Appl. No. 15/006,273 dated Aug. 8, 2017, 3 pages.
Response to Non-Final Office Action filed on Apr. 27, 2017 for U.S. Appl. No. 15/006,273 dated Jan. 27, 2017, 10 pages.
Final Office Action received for U.S. Appl. No. 13/164,380, dated Apr. 17, 2015, 15 pages.
Final Office Action received for U.S. Appl. No. 13/164,380, dated Apr. 22, 2014, 21 pages.
Non-Final Office Action received for U.S. Appl. No. 13/164,380, dated Oct. 15, 2014, 13 pages.
Non-Final Office Action received for U.S. Appl. No. 13/164,380, dated Sep. 27, 2013, 13 pages.
Notice of Allowance received for U.S. Appl. No. 13/164,380, dated Sep. 18, 2015, 9 pages.
Pre-Apeal Brief Request filed on Jun. 27, 2014 for U.S. Appl. No. 13/164,380, 5 pages.
Response to Final Office Action filed on Aug. 17, 2015, for U.S. Appl. No. 13/164,380, dated Apr. 17, 2015, 9 pages.
Response to Non-Final Office Action filed on Feb. 17, 2015, for U.S. Appl. No. 13/164,380, dated Oct. 15, 2014, 11 pages.
Response to Non-Final Office Action filed on Jan. 27, 2014, for U.S. Appl. No. 13/164,380, dated Sep. 27, 2013, 15 pages.
U.S. Appl. No. 13/164,380 U.S. Pat. No. 9,250,866, filed Jun. 20, 2011, Systems and Methods for Incremental Software Deployment.
U.S. Appl. No. 15/006,273 U.S. Pat. No. 10,007,511, filed Jan. 26, 2016, Systems and Methods for Incremental Software Deployment.

\* cited by examiner

20

SYSTEMS AND METHODS FOR INCREMENTAL SOFTWARE DEPLOYMENT

REFERENCE TO RELATED APPLICATION

This application is a continuation of U.S. application Ser. No. 15/006,273, filed Jan. 26, 2016, which is a continuation of U.S. application Ser. No. 13/164,380, filed Jun. 20, 2011, each of which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawings that form a part of this document: Copyright 2011, eBay Inc. All Rights Reserved.

TECHNICAL FIELD

This application relates generally to software deployment and, more specifically, to systems and methods for the incremental deployment of software related to large-scale software projects onto one or more computing or processing systems.

BACKGROUND

As both the speed and functionality of computer systems increase, along with the size and capacity of their corresponding program and data storage devices, the size and complexity of software applications or projects executing on such systems continue to follow a similar trend. To develop a typical large-scale application, such as an online commercial service website, a large team of software developers working in parallel to generate the application is often employed, along with a testing group to ensure that the resulting software performs according to a predefined set of functionality, reliability, and performance specifications.

Even after the application is initially deployed to one or more computing systems for execution, the development team often continues to generate new versions of the applications. Reasons for the continued development typically include enhancement of the features and/or performance of the current application, and correction of errors or faults that have been discovered in the current application version. Oftentimes, each of the new versions of the application is deployed on one or more computing systems by transmitting the entire new version of the application, or large predefined portions thereof, to the target system, stopping any ongoing execution of the current version of the application, replacing the current application version with the new version, and then executing the new version on the target system.

BRIEF DESCRIPTION OF THE DRAWINGS

Some embodiments are illustrated by way of example and not limitation in the figures of the accompanying drawings in which.

DETAILED DESCRIPTION

Example methods and systems for incremental software deployment are discussed. The systems and methods for deploying software, in some example embodiments, may involve use of a deployment system in conjunction with one or more target computing systems for executing the deployed software. In the following description, for purposes of explanation, numerous specific details are set forth in order to provide a thorough understanding of example embodiments. It will be evident, however, to one skilled in the art that the present subject matter may be practiced without these specific details. It will also be evident that the types of software deployment described herein are not limited to the examples provided and may include other scenarios not specifically discussed.

Example Software Deployment/Execution System and Method

Figure 1:
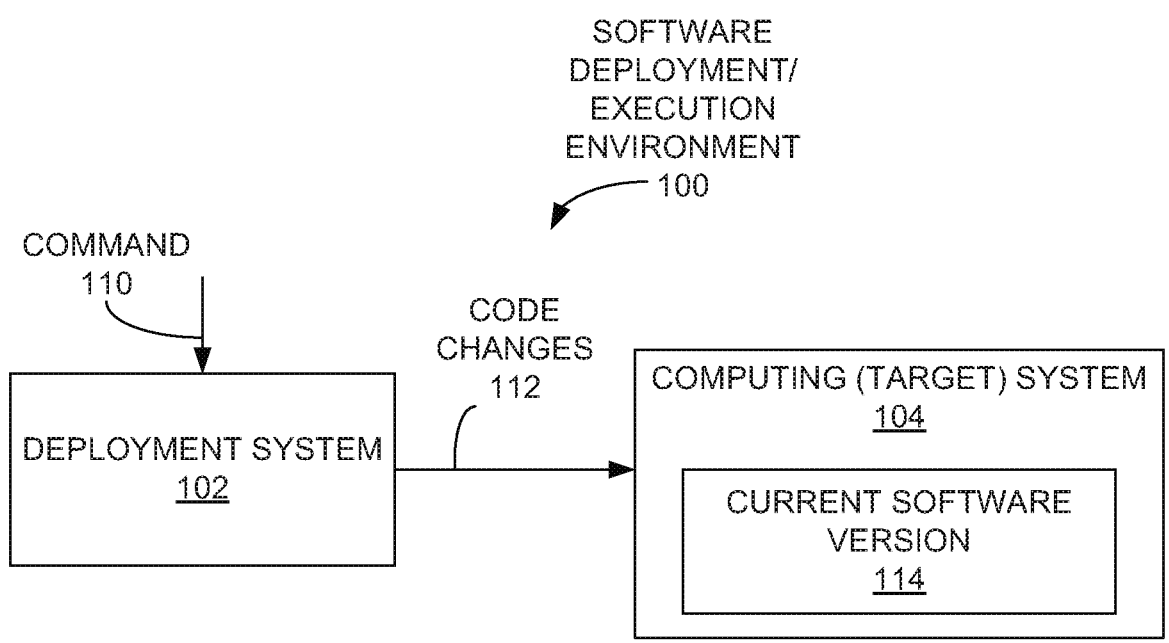
FIG. 1 is a block diagram illustrating an example software deployment/execution environment including a deployment system and a target computing system.

In accordance with an example embodiment, FIG. 1 illustrates a software deployment/execution environment 100 including a deployment system 102 and a computing or "target" system 104. Generally, the deployment system 102 provides executable software to the computing system 104 for execution on the computing system 104. In various embodiments discussed hereinafter, the deployment system 102 determines a set of code changes 112 to be made to a current (or first) software version 114 executing on the computing system 104 to yield another version of the software. The transfer of the code changes 112, instead of the entire other version, may facilitate faster implementation of software versions in the computing system 104 due to the smaller amount of data transferred from the deployment system 102 to the computing system 104. Further, in some examples, the code changes 112 may be implemented while the current software version 114 continues to be executed on the computing system 104.

Figure 2A:
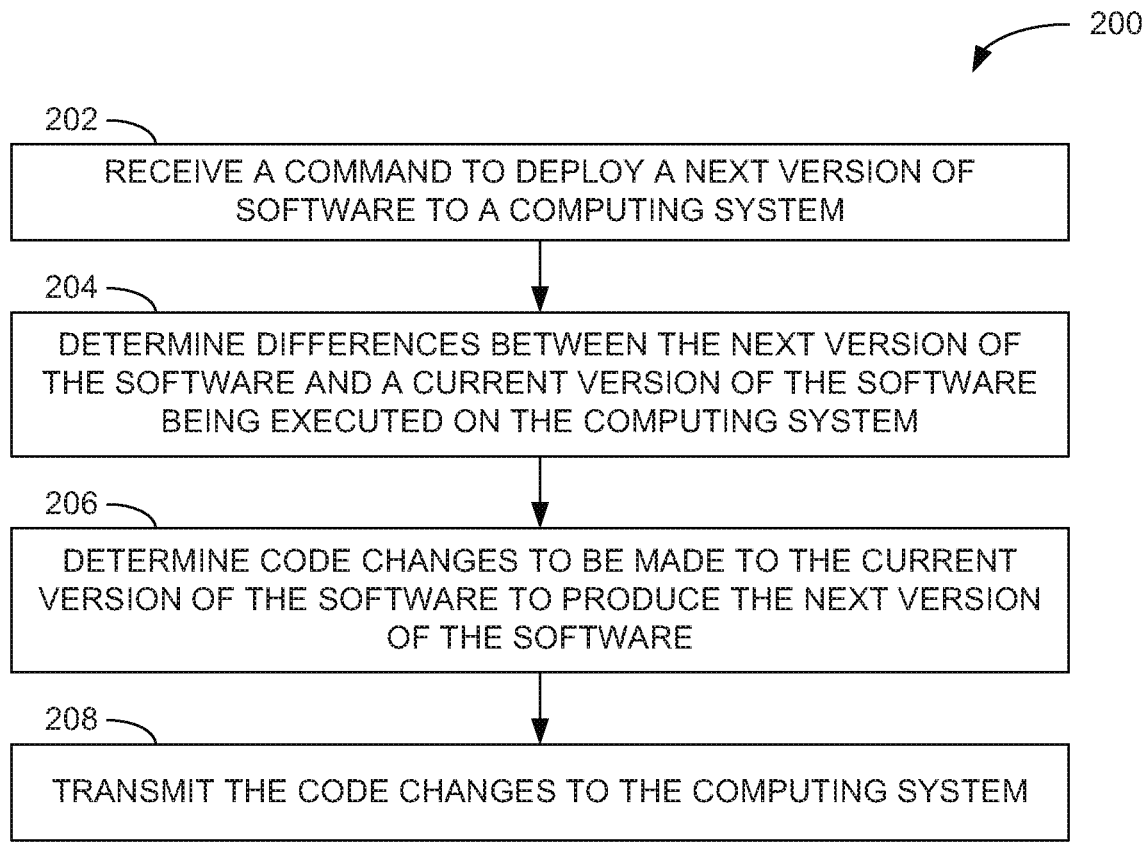
FIG. 2A is a flow diagram illustrating an example method for software deployment using the deployment system of FIG. 1.
Figure 2B:
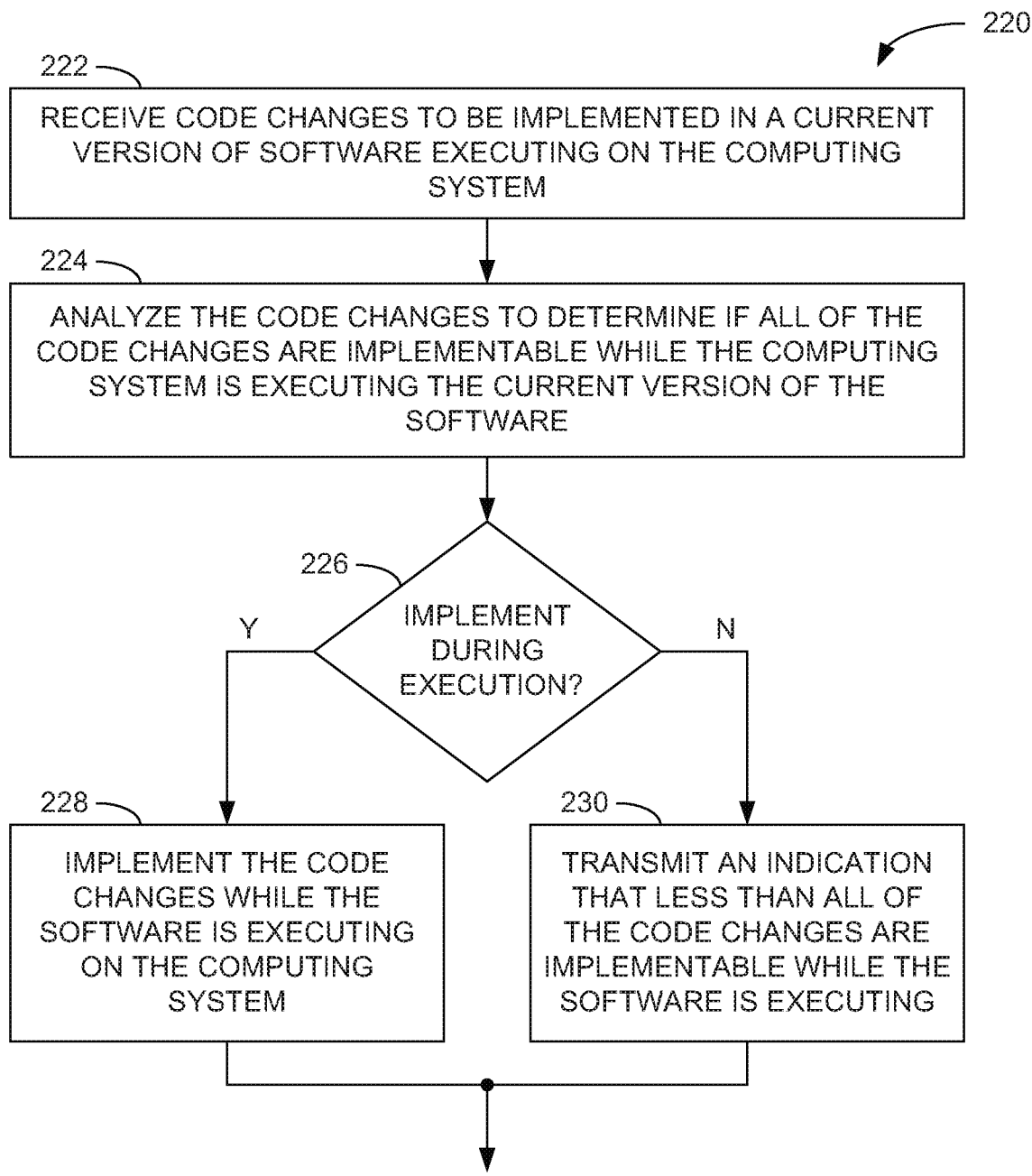
FIG. 2B is a flow diagram illustrating an example method for software deployment using the computing system of FIG. 1.

FIGS. 2A and 2B illustrate flow diagrams of a method for software deployment in reference to the software deployment/execution environment 100 of FIG. 1. More specifically, FIG. 2A depicts a method 200 employed in the deployment system 102, while FIG. 2B depicts a related method 220 used in the computing system 104. However, other software deployment/execution environments other than those shown in FIG. 1 may employ the methods 200, 220 depicted in FIGS. 2A and 2B in other examples. In the method 200 of FIG. 2A, the deployment system 102 receives a command 110 to deploy a next (or second) version of the software to the computing system 104 (operation 202). The next version of the software may include, for example, a newer or older version of the software compared to the current (or first) software version 114. In response to the command 110, the deployment system 102 determines differences between the next software version and the current software version 114 being executed on the computing system 104 (operation 204). The deployment system 102 determines the codes changes 112 to be made to the current software version 114 to produce the next software version (operation 206). The deployment system 102 transmits the code changes to the computing system 104 (operation 208).

Continuing with the method 220 of FIG. 2B, the computing system 104 receives the code changes 112 to be implemented in the current software version 114 being executed by the computing system 104 (operation 222). The computing system 104 analyzes the code changes 112 to determine if all of the code changes 112 are implementable while the computing system 104 is executing the current software version 114 (operation 224). If the code changes 112 can be implemented during execution of the current software version 114 (operation 226), the computing system 104 implements the code changes 112 while the software is executing the current version 114 on the computing system to produce the next version of the software (operation 228). Otherwise, if the code changes 112 cannot be implemented during execution of the current software version 114 (operation 226), the computing system 104 transmits an indication that less than all of the code changes 112 are implementable while the current software version 114 is being executed (operation 230).

In another example, each of the methods 200, 220 may be encoded as instructions on a non-transitory computer-readable storage medium, such as, for example, an integrated circuit, magnetic disk, or optical disk, which are readable and executable by one or more computers or other processing systems, such as the deployment system 102 and the computing system 104 of FIG. 1.

In employing the methods 200, 220, only code changes 112 needed to transform the current software version 114 executing on the computing system 104 into a further software version are transmitted from the deployment system 102 to the computing system 104. In addition, as only a portion of the current software version 114 is being replaced, the software may continue to be executed during the replacement in at least some examples, thus allowing the computing system 104 to perform the functions provided by the software without stopping and restarting the software. Other example software deployment/execution environments and methods are described below.

Other Example Software Deployment/Execution Systems and Methods

Figure 3A:
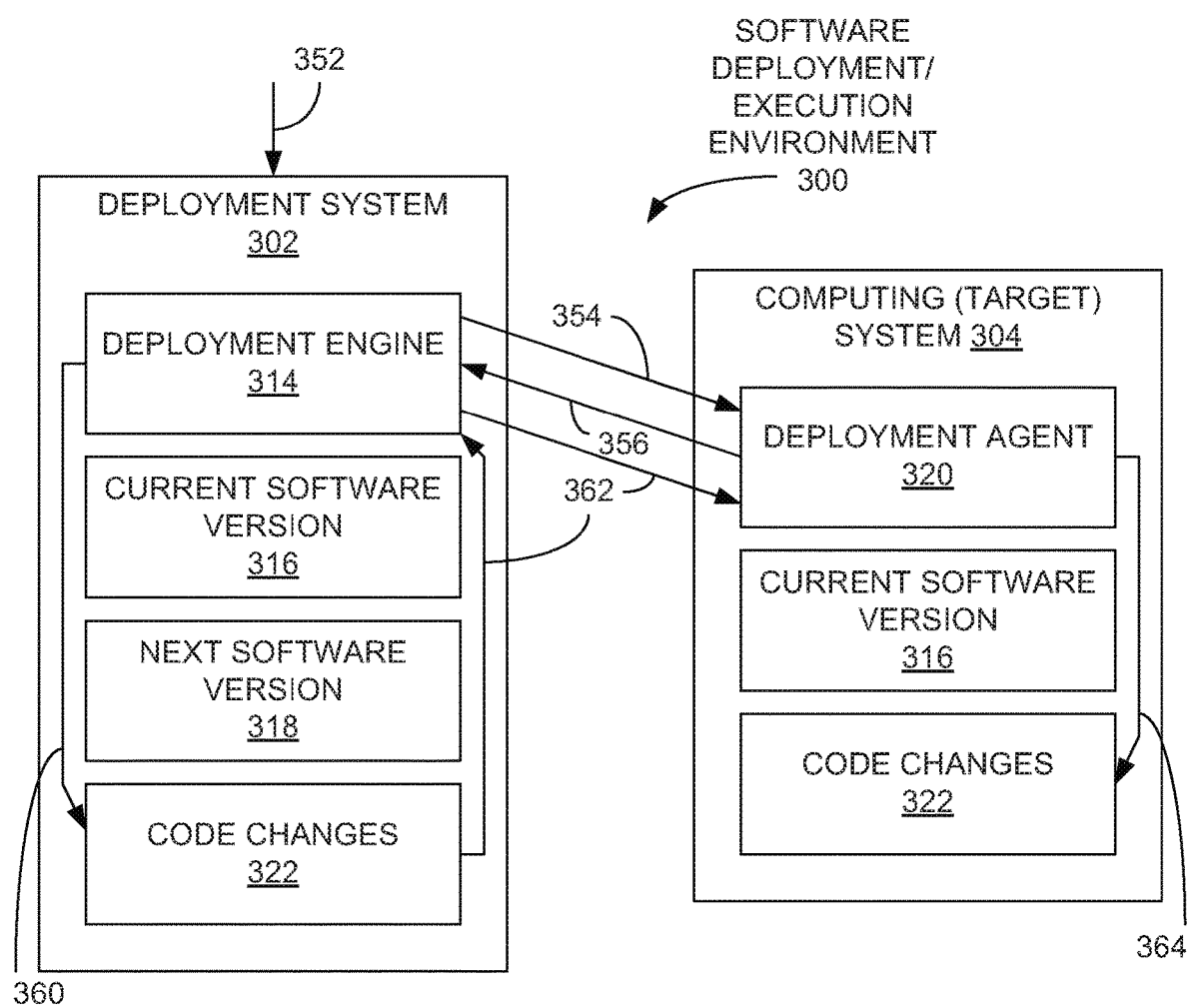
FIG. 3A is a block diagram illustrating another example software deployment/execution environment.

FIG. 3A depicts a software deployment/execution system or environment 300 that includes a software deployment system 302 and a "target" computing system 304. The computing system 304 may be any electronic system capable of executing any type of software or firmware, such as, for example, an application, applet, process, or task. The software may be any code in any language that may be executed on the computing system 304. For example, the software may be coded in a language directly executed by a hardware processor of the computing system 304. In another embodiment, the software may be executable by a "virtual machine," such as a Java Virtual Machine (JVM), running on the computing system 304. The software may, in another example, be written in a script or other interpretable language. Examples of the computing system 304, include, but are not limited to, a server, a desktop or laptop computer, a portable communication device, a personal digital assistant (PDA), and an electronic device incorporating an embedded processor.

In the example of FIG. 3A, a deployment agent 320 is a software module or process executing on the computing system 304 to accomplish several tasks associated with the deployment of new software versions on the computing system 304. Such tasks include, for example, the reception and storage of code changes 322, and the implementation of the code changes 322 in the current software version 316 on the computing system 304 to produce another version. The deployment agent 320 may also perform other duties relating to software deployment on the computing system 304, as described below. In the embodiment of FIG. 3A, the deployment agent 320 is shown separately from the current software version 316 executing on the computing system 304. In another example, the deployment agent 320 exists as a part of the current software version 316.

The deployment system 302 may be any electronic system capable of performing the particular methods described more particularly below, such as, for example, comparing different software versions, generating code changes 322 based on those differences, and transmitting the code changes 322 to the computing system 304. The deployment system 302 may be any electronic processing system or computing system capable of performing such tasks. As with the computing system 304, examples of the deployment system 302 include, but are not limited to, a server, a desktop or laptop computer, a portable communication device, a PDA, and an electronic device incorporating an embedded processor. While the deployment system 302 and the computing system 304 are depicted in FIG. 3A as separate electronic systems, the deployment system 302 and the computing system 304 may operate from the same computer system or platform in one example.

In another example, the deployment system 302 may be combined with, or exists as a portion of, a software development system, such as an integrated development environment (IDE). In some examples, an IDE includes a source code compiler, a linker, a debugger, and one or more build automation tools to aid a software developer in generating and testing software.

As depicted in FIG. 3A, a deployment engine 314 executes on the deployment system 302 to perform various tasks associated with the deployment of software on the computing system 304. In an example, these tasks include, but are not limited to, the generation and transmission of code changes 322 to be implemented in the current software version 316 on the computing system 304.

Figure 3B:
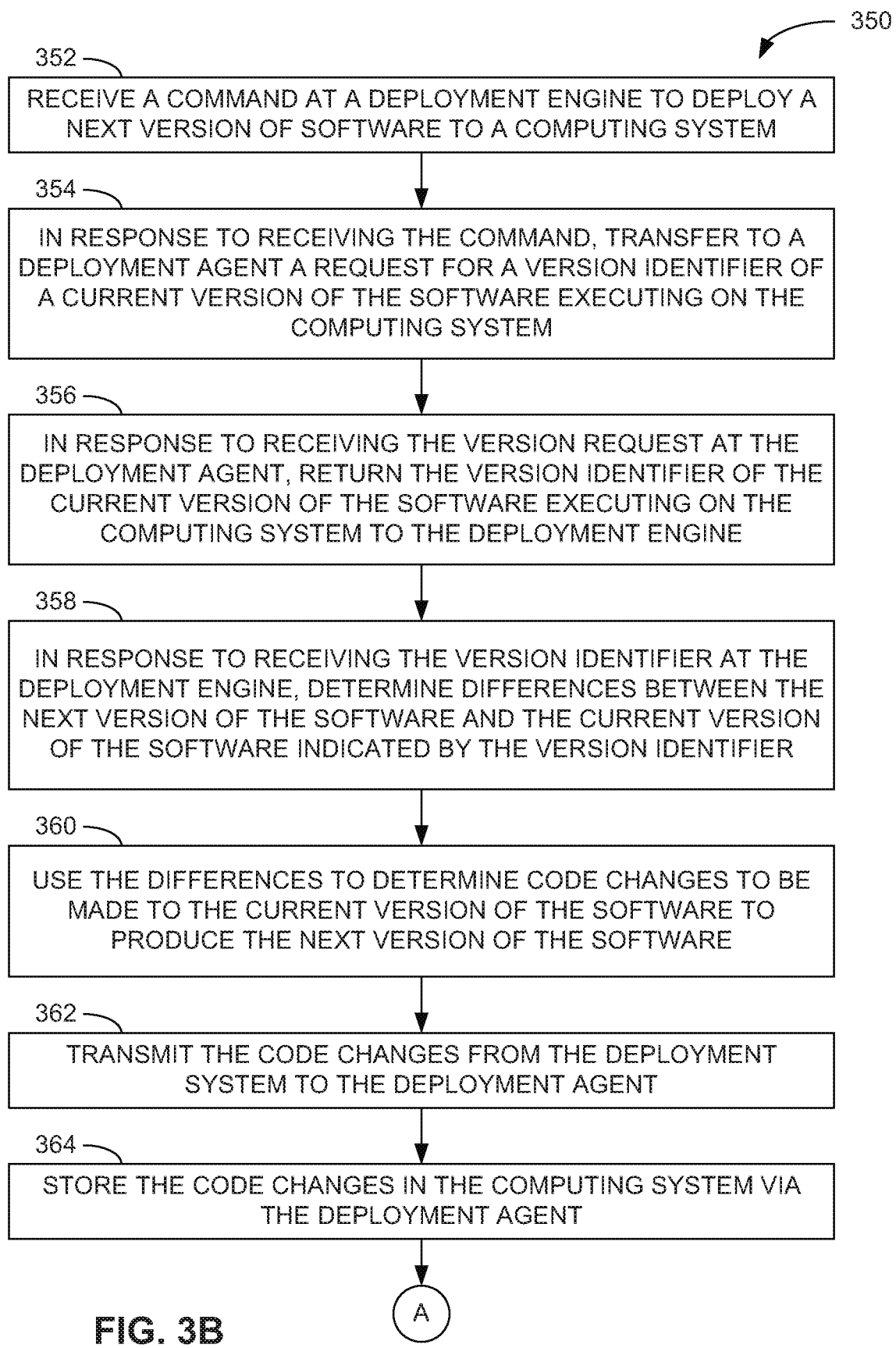
FIG. 3B is a flow diagram illustrating an example method for software deployment associated with the block diagram of FIG. 3A in which code changes are transmitted to the computing system.

FIG. 3B illustrates an example method 350 of operating the software deployment/execution environment 300 of FIG. 3A, wherein at least some operations of the method 350 are denoted. In the method 350, a command to deploy a next version of software to the computing system 304 is received at the deployment system 302 (operation 352). In one example, the command may be entered by a user by way of a graphical user interface (GUI) provided by the deployment system 302. In other embodiments, the command may be received at the deployment system 302 from another system by way of a communication link, such as a network. In another example, the command may be generated internally in response to one or more conditions, such as the availability of a new software version that has been tested and validated.

In response to the command, the deployment engine 314 transfers to the computing system 304 a request for a version identifier of the current software version 316 currently executing on the computing system 304 (operation 354). In one example, the version identifier may include a group of alphanumeric characters identifying a particular software version. Such information is useful if different computing systems 304 may be executing different software versions. This scenario may be likely in systems in which numerous computing systems 304 are executing the same software application. In one example, each possible software version represents a version of the software that has been tested and successfully validated for deployment on the computing system 304. In response to receiving the request, the deployment agent 320 returns the version identifier of the current software version 316 to the deployment engine 314 (operation 356).

After receiving the version identifier, the deployment engine 314 determines differences between the next software version 318 to be deployed to the computing system 304, and the current software version 316 currently executing on the computing system 304, which is identified by the received version identifier (operation 358). In one embodiment, the deployment system 302 may store, or have access to, multiple versions of the software executing on various computing systems, including, but not limited to, the current software version 316 executing on the computing system 304 and the next software version 318 to be deployed. For example, other versions of the software being executed on other computing systems may be stored in the deployment system 302. In such cases, the deployment engine 314 will be able to select the correct software version currently being executed in the target computing system 304 by way of the software version identifier received from the computing system 304. While the example of FIG. 3A depicts the current software version 316 and the next software version 318 as being stored in the deployment system 302, other examples may facilitate access to the software versions 316, 318 stored in an external database or storage system by way of a communication network or link.

In one embodiment, to determine the differences between the current software version 316 and the next software version 318, the deployment engine 314 may employ comparison logic to analyze the software versions 316, 318 at some predetermined level of granularity to determine those portions that are different between the two versions 316, 318. In one example, in situations in which the software is apportioned among a number of separate binary modules or files, such as libraries or class files, the deployment engine 314 may compare each module of the current software version 316 with the corresponding module of the next software version 318. If the two modules are different, the deployment engine 314 may designate the corresponding module of the next software version 318 as a code change 322 to be made to the current software version 316 in the computing system 304.

In one implementation, the deployment engine 314 modules may compare corresponding modules of the two software versions 316, 318 by any of a number of methods, such as a direct comparison of data constituting the code of the two modules (for example, byte-by-byte), or by merely comparing versions of the modules (which may be embedded within, or associated with, the modules). If the two modules are identical, or at least represent the same functional code, the deployment system 302 will not generate any code changes 322 associated with that module. In another example, the deployment engine 314 may calculate a hash value (such as MD5 (Message-Digest algorithm 5)) or a checksum over each of the two modules. If the hash values or checksums of the two modules being compared are equal, the module associated with the current software version 316 need not be replaced or modified using the corresponding module of the next software version 318.

In other examples, the deployment engine 314 may compare smaller or larger corresponding portions or subdivisions of the two software versions 316, 318 to determine the differences therebetween. For example, the deployment engine 314 may compare corresponding functions, subroutines, procedures, class methods, or other identifiable code segments of the software versions 316, 318 to identify those segments that are different between the software versions 316, 318. If differences are found, the deployment engine 314 may employ associated code segments of the next software version 318 to generate the code changes 322. In yet other implementations, the deployment engine 314 may compare actual instructions or even smaller portions of the two software versions 316, 318 to determine the differences between the software versions 316, 318.

In one example, differences between the current software version 316 and the next software version 318 are not limited to corresponding modules, files, procedures, or other code segments existing in both versions 316, 318. For example, the next software version 3118 may include code segments not present in the current version 316, or may omit certain segments present in the current version 316. Such differences would ultimately be represented or described in the code changes 322 generated by the deployment engine 314. Further, differences between the two software versions 316, 318 may not be limited to various executable code segments, but may also include numerical constants, character strings, and other data not specifically identifiable as code segments. Any such differences may be represented in the code changes 322 generated by the deployment engine 314.

Based on the determination of the differences between the current software version 316 and the next software version 318, the deployment engine 314 generates a set of code changes 322 that may be implemented in the current software version 316 to produce the next software version 318 (operation 360). In one example, the deployment engine 314 may generate the code changes 322 by identifying binary modules or files constituting the next software version 318 that include the differences previously identified, and identifying the modules or files as the code changes 322. In other embodiments, the deployment engine 314 may identify smaller or larger portions of the deployment system 302, such as individual functions, subroutines, procedures, class methods, or other identifiable code segments of the next software version 318 as the code changes 322. In some deployment environments, the smaller the amount of code encompassed in each code change 322, the smaller the total amount of data that may be associated with the code changes 322, as less code that has not actually been modified may then be represented in the code changes 322. On the other hand, deployment of numerous, smaller code changes 322 in lieu of fewer, larger code changes 322 may be more difficult and time-consuming for the deployment agent 320 to implement in some examples.

Each of the code changes 322 may also include, or be accompanied with, metadata that further describes its associated code change 322, in addition to the actual software code or data to be implemented in the current software version 316. For example, the metadata may include an indication of which portion of the current software version 316 may be replaced with the code change 322, such as a code segment identifier (for example, a name or identifier for a library, function, procedure, or class). In other implementations, the metadata may include a relative memory address or range identifying a segment within the current software version 316 which is to be replaced or otherwise affected by the associated code change 322. Additionally, the metadata may also identify other portions of the current software version 316 that are not to be replaced, but are otherwise affected, by the code change 322. Such portions of the current software version 316 may include, for example, function or procedure calls or references to code segments of the current software version 316 that are being replaced or altered as a result of a code change 322. Other types of metadata included in or with the code changes 322 that facilitate the implementation of the code changes 322 on the computing system 304 may also be possible in other embodiments.

After generating the code changes 322 (operation 360), the deployment engine 314 transmits the code changes 322 to the deployment agent 320 (operation 362). In one example, the code changes 322, which may include multiple code segments or files, possibly accompanied by metadata, may be compressed into a more compact format, such as, for example, a ZIP file, before being transmitted to the computing system 304. The communication medium over which the code changes 322 may be transmitted, may include, for example, a local-area network (LAN) or a wide-area network (WAN), such as the Internet. Further, in response to receiving the code changes 322, the deployment agent 320 may store the code changes 322 locally within the computing system 304 (operation 364), or in a database or storage system external to, but accessible by, the computing system 304.

Figure 4A:
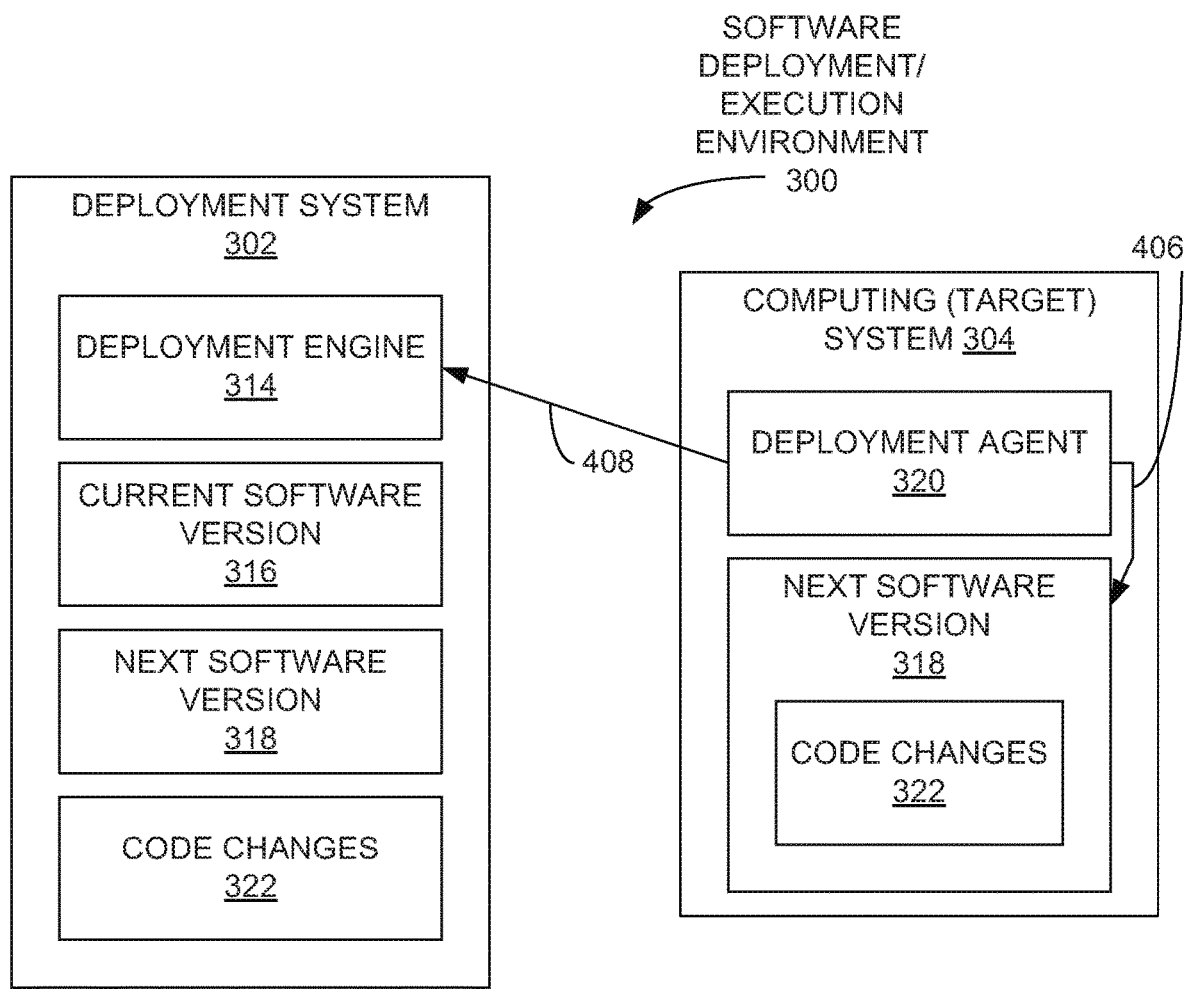
FIG. 4A is a block diagram illustrating the example software deployment/execution environment of FIG. 3A in which code changes are made in the computing system while the software is executed.
Figure 4B:
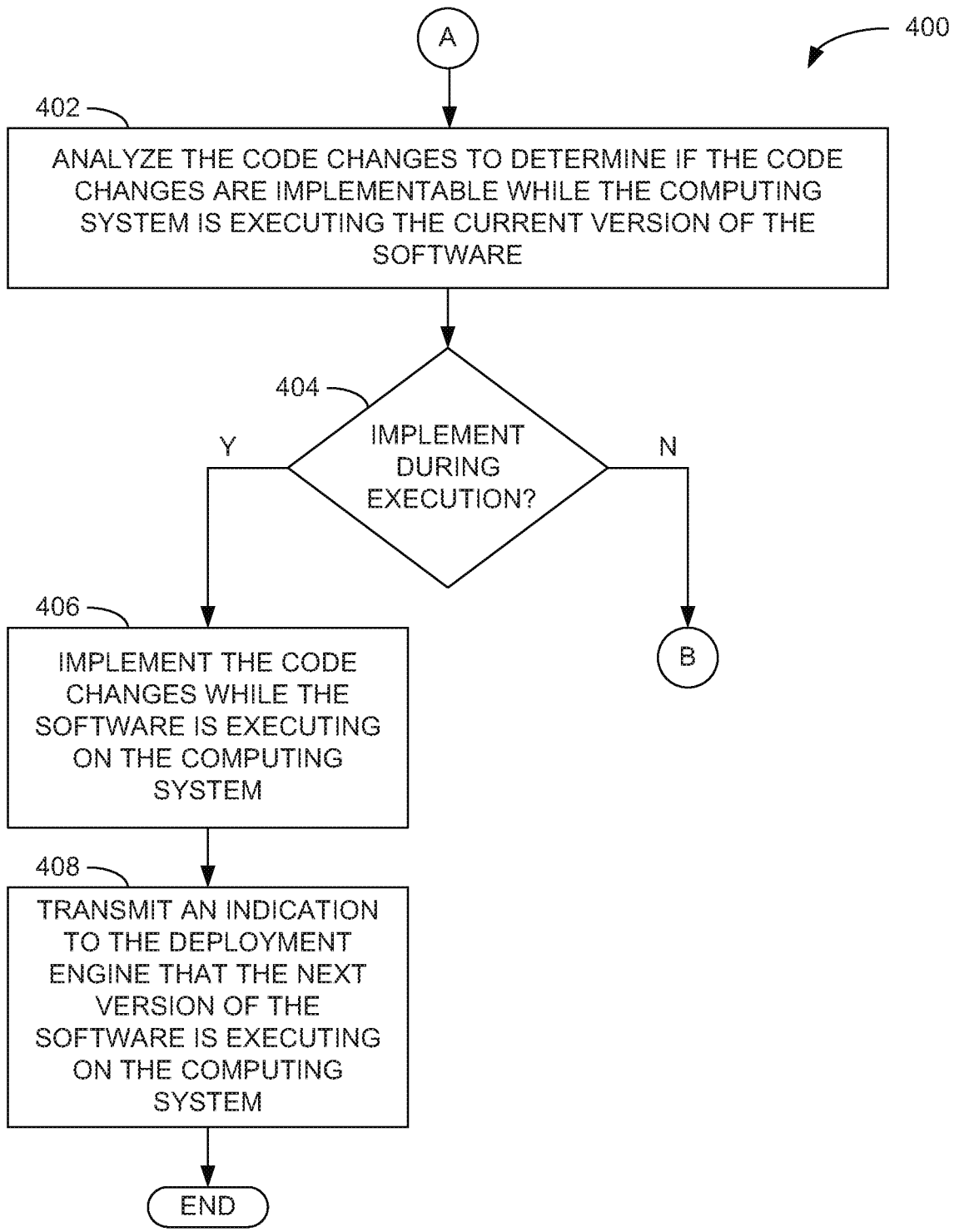
FIG. 4B is a flow diagram illustrating an example method for software deployment associated with the block diagram of FIG. 4A.

FIG. 4B illustrates an example method 400 serving as a continuation of the method 350 (FIG. 3B) of operating the example software deployment/execution environment 300 of FIG. 3A. More specifically, the method 400 encompasses the determination made by the deployment agent 320 as to whether the code changes 322 may be implemented "on-the-fly" (i.e., while the current software version 316 is executing on the computing system 304), as well as the actions of the deployment agent 320 is such an implementation is determined to be possible. FIG. 4A illustrates a block diagram of the example software deployment/execution environment 300 annotated to reflect at least some of the operations of the example method 400 of FIG. 4B.

In the method 400, the deployment agent 320 analyzes the stored code changes 322 to determine if the code changes 322 may be implemented while the computing system 304 is executing the current software version 316 (operation 402). In one embodiment, the deployment agent 320 identifies a programming language associated with each of the code changes 322 to determine whether the associated code change 322 may be implemented during execution of the current software version 316. For example, code changes 322 involving at least some Java-related files, such as class files, may be implemented during execution of the current version 316, as may at least some software files written in a scripting language or other interpreted language, such as Perl. Oppositely, code changes 322 associated with more statically-oriented programming languages may not be implemented dynamically while the current software version 316 is executing.

In another example, the deployment agent 320 may base its decision on whether a particular code change 322 is dynamically implementable on the type of file affected by the code change 322. For example, dynamically-linked libraries (DLLs) and similar code segments that may be linked to the current software version 316 at runtime may be candidates for dynamic implementation, while static libraries and other similar codes segments may not.

In some embodiments, the deployment agent 320 may determine whether one or more code changes 322 may be implementable during execution of the current software version 316 based on the particular portion of the current software version 316 being affected, or on the frequency with which that portion of the software is executed. For example, changes to frequently-used code segments, or to code segments that constitute part of a primary or main execution loop, may not be candidates for implementation during software execution, while other code segments that are infrequently executed, or that constitute at least a portion of a code branch that is rarely executed, may be implemented during execution of the current software version 316.

If the deployment agent 320 determines that all of the code changes 322 may be implemented while the computing system 304 executes the current software version 316 (operation 404), the deployment agent 320 may proceed with the actual implementation of the code changes 322 (operation 406). In one embodiment, the deployment agent 320 determines the order in which each of the code changes 322 is implemented. For example, the deployment agent 320 may discover that a first code change 322 should be implemented before, or concurrently with, a second code change 322 due to a logical or temporal dependency of the second code change 322 on the first code change 322. Other considerations affecting the order in which multiple code changes 322 may be implemented may also be considered.

In some implementations, the deployment agent 320 may also determine the timing by which each of the code changes 322 is implemented. In one example, the deployment agent 320 may determine that a code segment of the current software version 316 that is to be replaced by, or is otherwise affected by, one of the code changes 322, is currently executing. If so, the deployment agent 320 may delay implementation of the corresponding code change 322 until that particular code segment of the current version 316 is complete. In some environments, the deployment agent 320 may possess the ability to prevent or "lockout" execution of a particular code segment of the current software version 316 to allow the implementation of code changes 322 that affect the particular code segment.

In one example, the deployment agent 320 makes decisions regarding the order, timing, or other aspects of the implementation of the code changes 322 during execution of the current software version 316 based solely upon its analysis of the code changes 322. In other implementations, the deployment agent 320 may consider metadata associated with the code changes 322 received from the deployment engine 314 in making such decisions.

Figure 7:
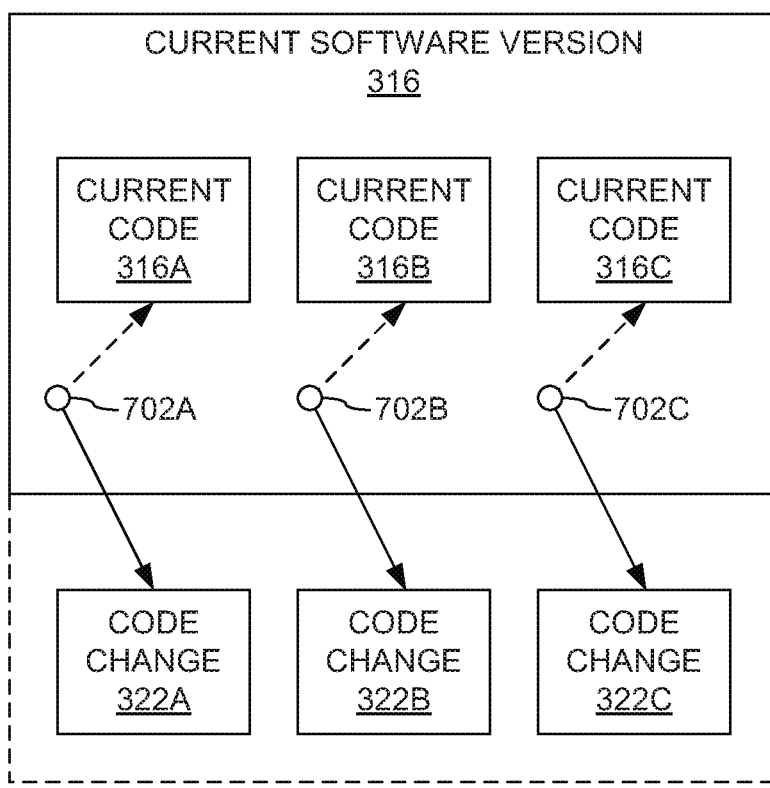
FIG. 7 is a graphical representation of an example of code changes being implemented into a current software version to produce a next software version.

FIG. 7 provides one example of how the deployment agent 320 may implement the code changes 322 into the current software version 316. As shown, the current software version 316 includes portions of current code 316A, 316B, 316C that are to be replaced by corresponding code changes 322A, 322B, 322C. The current code 316A, 316B, 316C each may be any identifiable portion of the current software version 316, including, but not limited to, modules, procedures, functions, methods, instructions, constants, and character strings. As with the current code portions 316A, 316B, 316C, the code changes 322A, 322B, 322C are stored in an area of executable memory space. In one example, the code changes 322A, 322B, 322C are stored in the executable memory space as soon as the code changes 322 are received at the deployment agent 320 from the deployment engine 314. In this case, to implement the code changes 322, the deployment agent 320 redirects references or links 702A, 702B, 702C in the current software version 316 from each segment of current code 316A, 316B, 316C being replaced to its corresponding code change 322A, 322C, 322C. Such links 702A, 702B, 702C may be, for example, function calls, jump instructions, data references, and the like, that may be modified by replacing a reference address for a current code segment 316A, 316B, 316C to a reference address for the corresponding code change 322A. As described above, the deployment agent 320 may determine when such a modification to the link 702A, 702B, 702C may occur.

In another embodiment, the code change 322A, 322B, 322C may actually be stored in memory to overwrite its corresponding current code 316A, 316B, 316C. For example, if the code change 322A possesses a smaller memory footprint that its associated current code 316A, the code change 322A may be written over the current code 316A. In another embodiment, an initial portion of the current code 316A may replaced with a jump instruction or other redirection of execution to the corresponding code change 322A.

Returning to FIG. 4B, once the code changes 322 are implemented in the current software version 316 to produce the next software version 318 (operation 406), the deployment agent 320 may transmit an indication to the deployment engine 314 that the next software version 318 is operating on the computing system 304 (operation 408). The deployment engine 314 may use this indication to determine how to proceed regarding deployment of the next software version 318 to another computing system 304, according to one example.

Also, in response to successfully implementing the code changes 322 into the current software version 316 during execution, the deployment agent 320 may reallocate or release memory occupied by the current software version 316 portions that have been omitted in favor of the code changes 322. This reallocation may take place while the next software version 318 continues to execute, or during a subsequent restart of the next software version 318, depending on the specific embodiment.

Figure 5A:
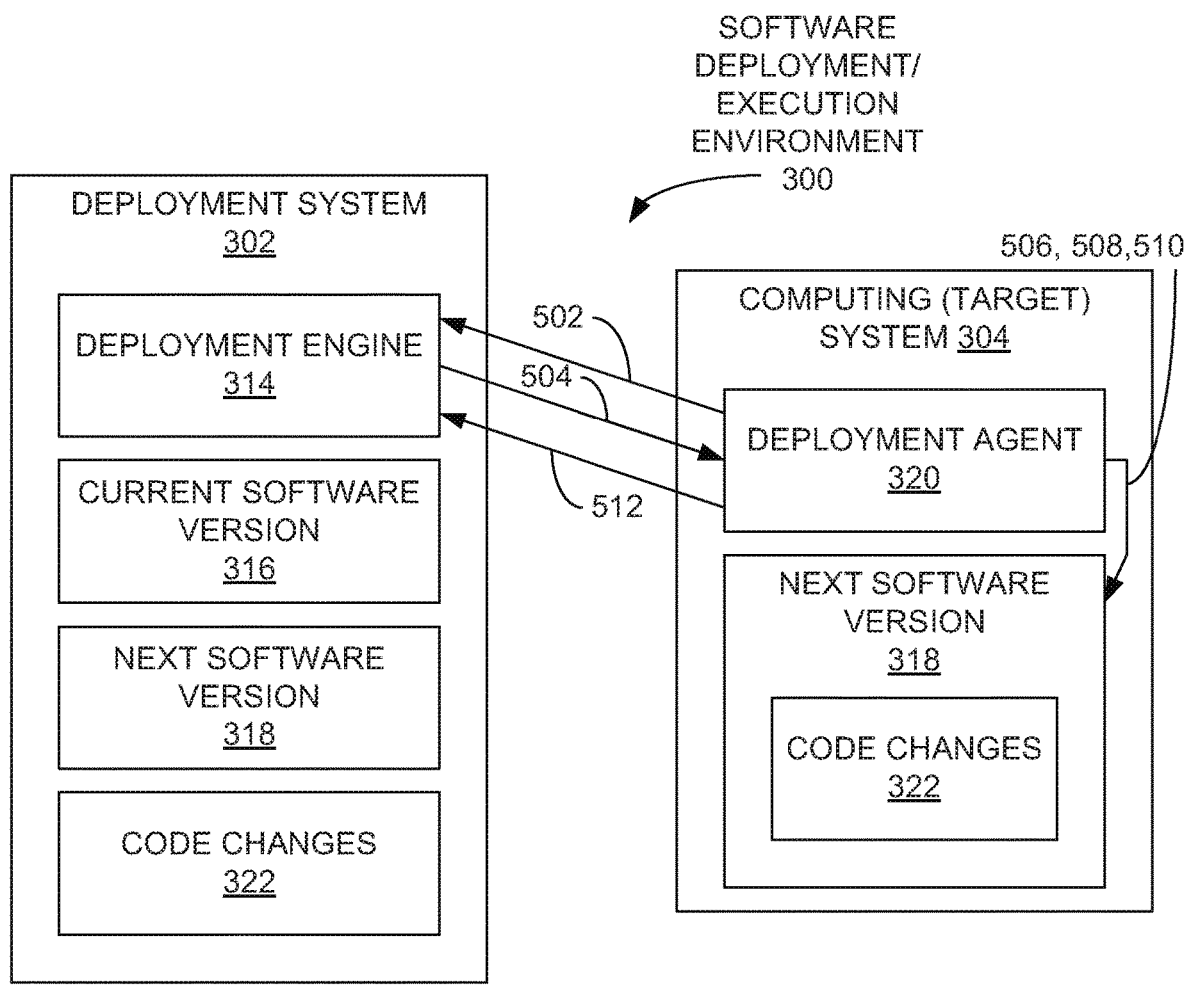
FIG. 5A is a block diagram illustrating the example software deployment/execution environment of FIG. 3A in which code changes are made in the computing system as the result of a restarting of the software.
Figure 5B:
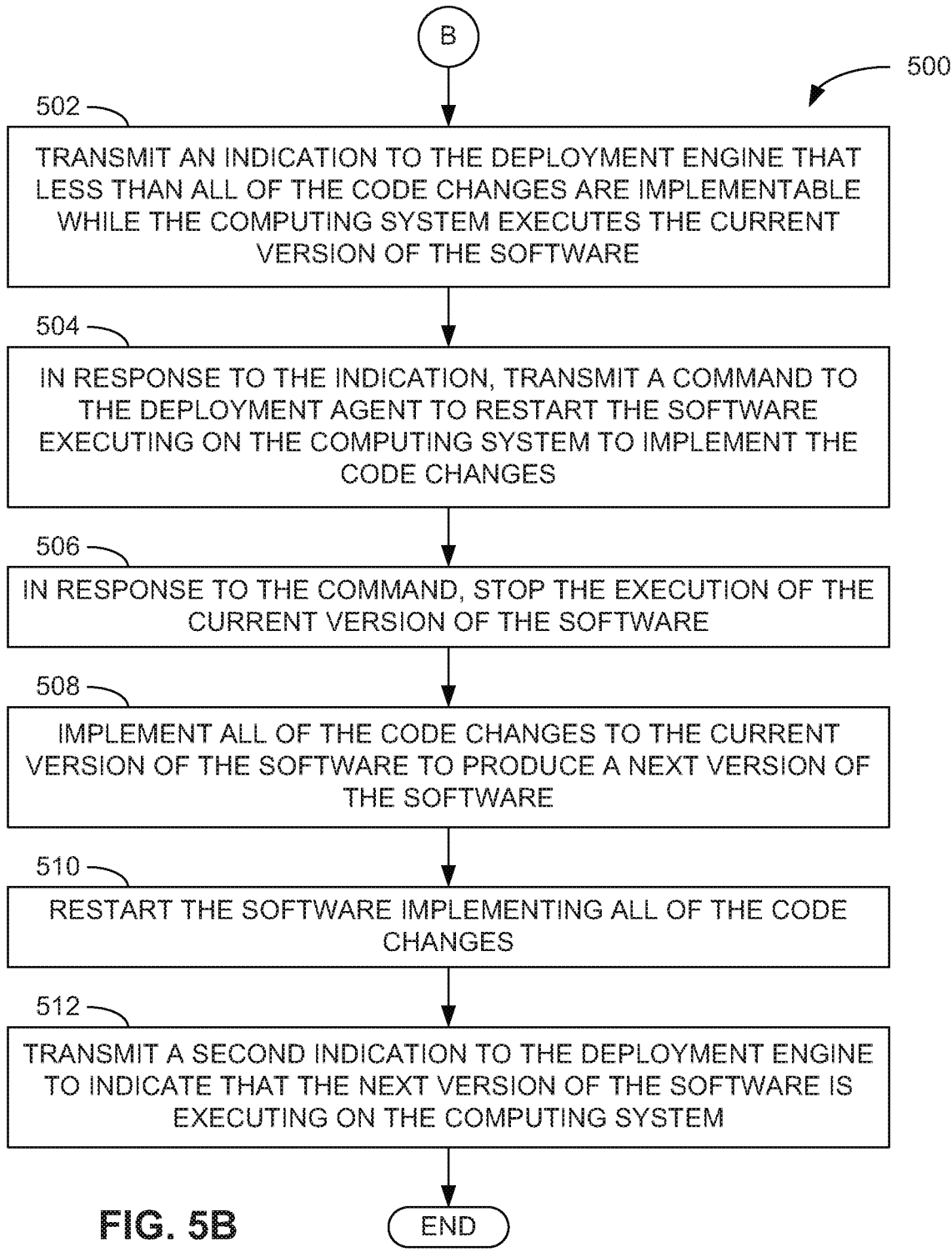
FIG. 5B is a flow diagram illustrating an example method for software deployment associated with the block diagram of FIG. 5A.

FIG. 5B illustrates an example method 500 serving as a continuation of the method 400 of operating the example software deployment/execution environment 300 of FIG. 3A. More specifically, the method 500 describes operations that may occur when the deployment agent 320 determines that the received code changes 322 cannot be implemented while the current software version 316 continues to execute on the computing system 304 (operation 404). At least some of the operations of the method 500 are signified in the example software deployment/execution environment 300 illustrated in FIG. 5A.

In the method 500, the deployment agent 320 transmits an indication to the deployment engine 314 that less than all of the code changes 322 are implementable while the computing system 304 executes the current software version 316 (operation 502). In one example, the deployment agent 320 has not implemented any code changes 322 at the time of transmitting the indication since a partial change from the current code version 316 to the next software version 318 may produce unexpected or undesired results. In other embodiments, the deployment agent 320 may undertake partial implementation of some subset of the code changes 322 if the code changes 322 are independent from other code changes 322 that could not be implemented during execution of the current software version 316.

In response to the indication, the deployment engine 314 may transmit a command to the deployment agent 320 to restart the current software version 316 so that the code changes 322 may be implemented (operation 504). As a result, the deployment engine 314 determines the relative timing of the restarting of the current software version 316 by timing the transmission of the command appropriately. As is described more fully below, such timing may be important in examples in which the next software version 318 is to be deployed to multiple computing systems 304.

In response to the command, the deployment agent 320 stops the execution of the current software version 316 (operation 506). In one example, the deployment agent 320 may delay the stopping of the execution for some period of time while an important or atomic portion of the current software version 316 is being executed, or while the current software version 316 continues to process data that may be corrupted or incompletely processed if the execution of the current software version 316 were halted immediately.

After stopping execution of the current software version 316, the deployment agent 320 may then implement all of the code changes 322 to the current software version 316 to produce the next software version 318 (operation 508). Unlike implementing the code changes 322 during execution, the order or relative timing of instituting the code changes 322 may be at least relatively unimportant. In one embodiment, the deployment agent 320 may implement the code changes 322 as described above in conjunction with FIG. 7. In other examples, the deployment agent 320 may rearrange the various code changes 322 and the portions of the current code version 316 that they replace in order to store the resulting next software version 318 in memory more efficiently than what may be possible if implementing the code changes 322 during execution.

Once all of the code changes 322 have been implemented (operation 508), the deployment agent 320 may then restart the software by initiating execution of what is now the next software version 318 (operation 510). After the restarting operation 510, the deployment agent 320 may transmit an indication to the deployment engine 314 that the next software version 318 is executing on the computer system 304 (operation 512). In one example, the deployment engine 314 may then use this information to proceed with the implementation of code changes 322 on another computing system 304.

Figure 6:
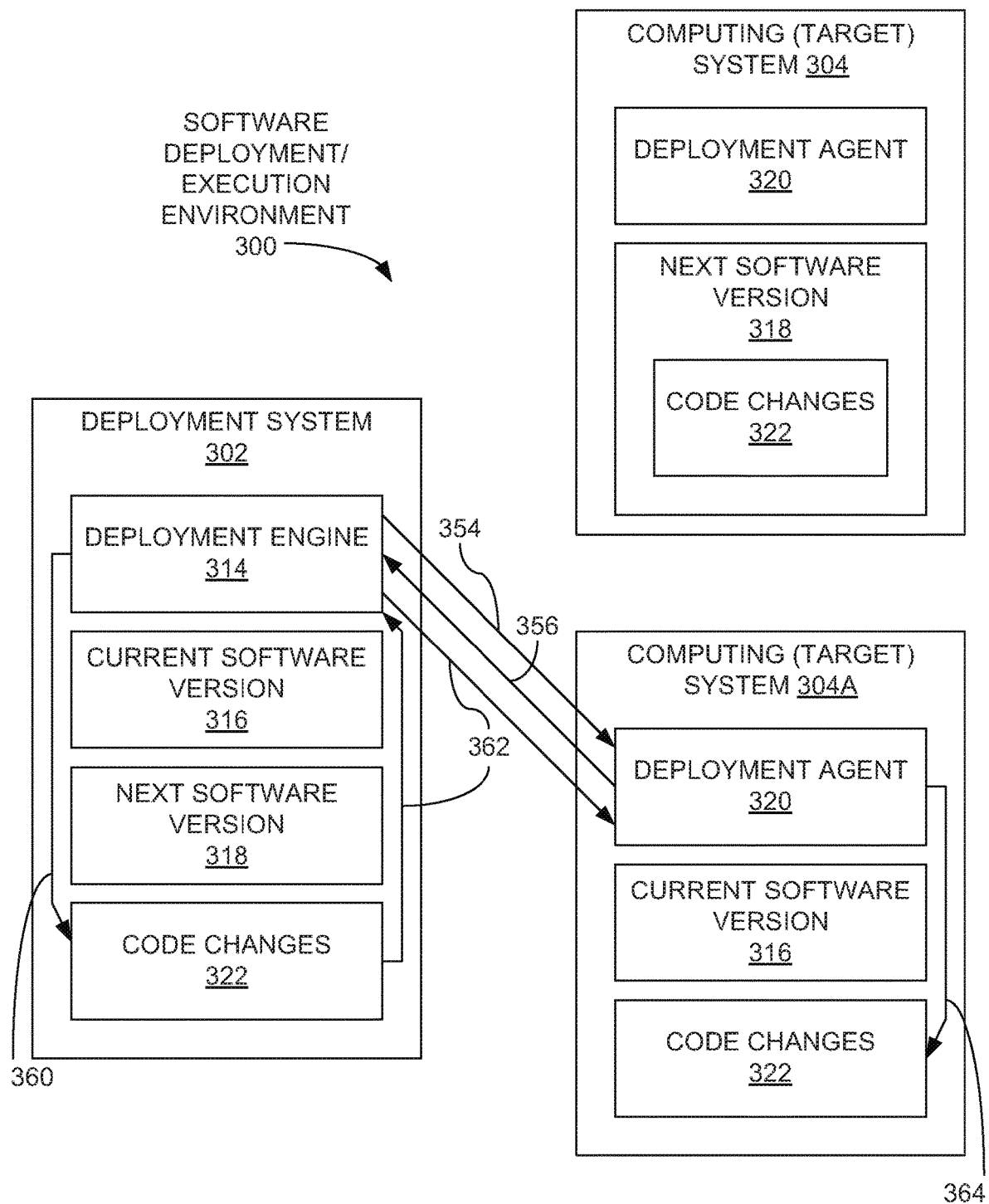
FIG. 6 is a block diagram illustrating the example software deployment/execution environment of FIG. 3A in which code changes are transmitted to a second computing system.

FIG. 6 illustrates the example software deployment/execution environment 300 involving a first computing system 304 and a second computing system 304A. In other examples, even more computing systems to which the code changes 322 are to be transmitted may be included in the environment 300. In the example of FIG. 6, the deployment agent 320 of the first computing system 304 has completed implementation of the code changes 322 to generate the next software version 318 currently being executed. As shown in FIG. 6, the deployment engine 314 proceeds to engage in various operations of the method 350 described above, including requesting (operation 354) and receiving (operation 356) from the second computing system 304A a version identifier for the current software version 316, determining the code changes 322 desired to produce the next software version 318, and transmitting the code changes 322 to the second computing system 304A. In one example, the version identifier received from the second computing system 304A may be different from that received from the first computing system 304, thus likely necessitating code changes 322 for the second computing system 304A that are different from the code changes 322 generated for the first computing system 304.

By way of the transmission of the code changes 322, as well as any requested restarting of software to the multiple computing systems 304, 304A, the deployment engine 314 may control the order and relative timing of when the software version on each of the computing systems 304, 304A is revised. For example, the deployment engine 314 may wait some predetermined time interval between deployment of the next software version 318 on the first computing system 304 and the second computing system 304A. This timing may be applied in situations in which the code changes 322 are implemented during execution of the current software version 316 or as the result of a restarting command transmitted by the deployment engine 314. In some embodiments, the use of a predetermined time interval between implementation of code changes 322 at the various computing systems 304, 304A, or at least the implementation of the code changes 322 in some specific order among the computing systems 304, 304A, may ensure that the deployment engine 314 is coordinating the deployment of the next software version 318 across the multiple computing systems 304, 304A in such a way that sufficient processing capability, responsiveness, and other aspects of the computing systems 304, 304A as a whole are maintained.

As a result of at least some of the embodiments discussed herein, by determining the differences between a current software version and a next software version, and then transmitting only the code changes employed to transform the current version into the next version, the amount of data to be transmitted from a deployment system to the computing system designated to execute the software may be greatly reduced compared to transferring and deploying the entire next version. Consequently, the amount of time consumed for such a deployment may be reduced greatly as well. Thus, the deployment of new versions of large enterprise-level software applications or projects to a multitude of computing systems may be greatly enhanced.

Further, since code changes, as opposed to an entire software package, are to be implemented, the changes may be incorporated while the current software version is executing, thus reducing or eliminating any downtime as a result of the upgrade, thus possibly allowing a deployment system to deploy new software versions more frequently. Such a deployment system allows much faster response time to implement additional features, improve performance, and address problems. Additionally, if a new software version is determined to be faulty in some respect, the same methods and systems described above may also be used to revert the current software version to a previous version known to be more reliable.

While much of the above discussion focuses on the use of the enclosed methods and systems in a production environment, any software system that benefits from periodic software versions or updates, such as in software development and test environments, may also benefit from application of the various concepts described herein.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations thereof. Example embodiments may be implemented using a computer program product (e.g., a computer program tangibly embodied in an information carrier in a machine-readable medium) for execution by, or to control the operation of, data processing apparatus (e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communications network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on their respective computers and having a client-server relationship to each other. In embodiments deploying a programmable computing system, it will be appreciated that both hardware and software architectures may be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set forth hardware (e.g., machine) and software architectures that may be deployed in various example embodiments.

Example Machine Architecture and Machine-Readable Medium

Figure 8:
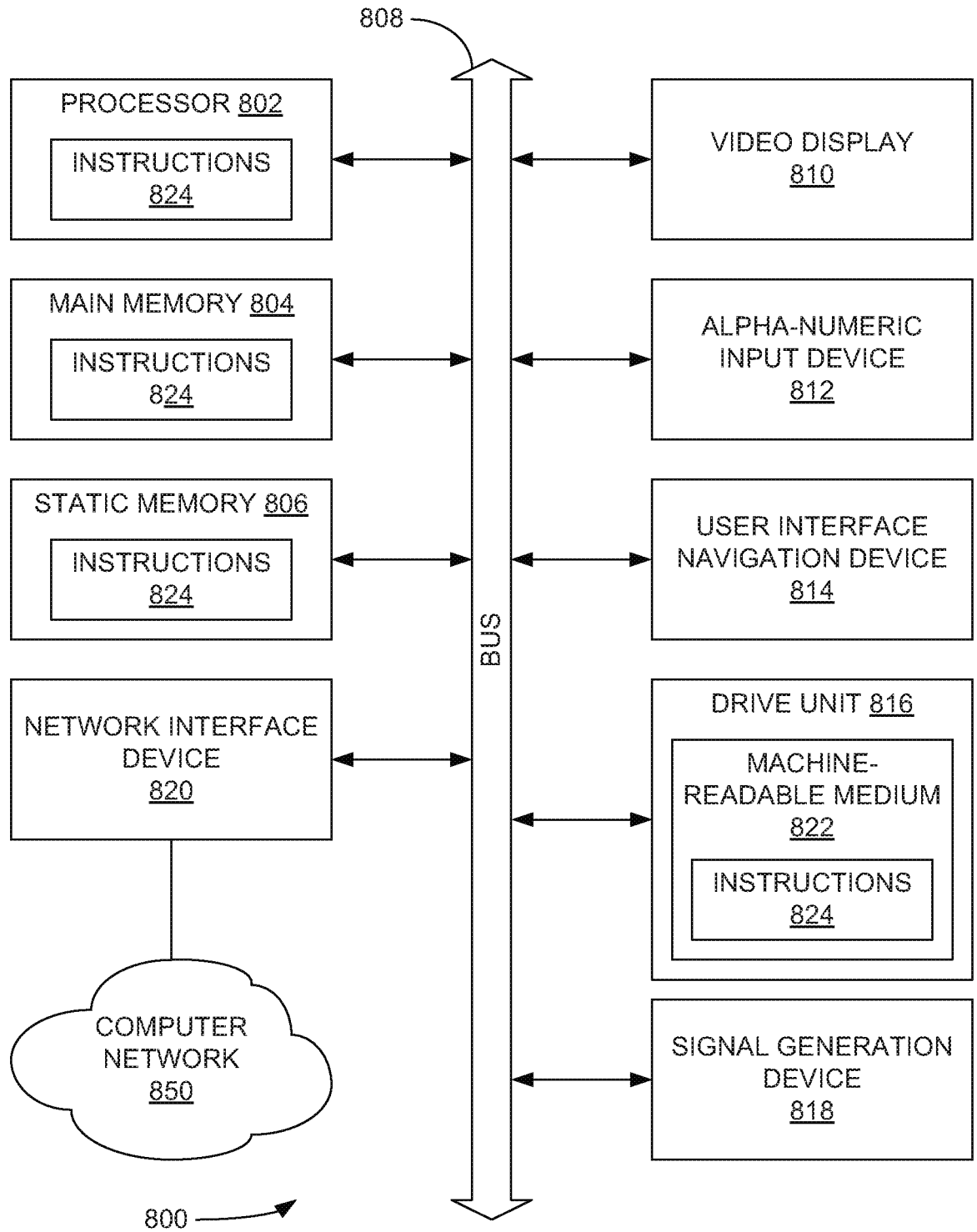
FIG. 8 is a diagrammatic representation of machine in the example form of a computer system within which a set of instructions for causing the machine to perform any one or more of the methodologies discussed herein may be executed.

FIG. 8 is a block diagram of a machine in the example form of a computer system 800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of data structures and instructions 824 (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.
Transmission Medium The instructions 824 may further be transmitted or received over a computer network 850 using a transmission medium. The instructions 824 may be transmitted using the network interface device 820 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

CONCLUSION

Thus, a method and system to facilitate incremental software deployment have been described. Although the present subject matter has been described with reference to specific example embodiments, it will be evident that various modifications and changes may be made to these embodiments without departing from the broader scope of the subject matter. For example, while the majority of the discussion above notes the use of the embodiments with respect to general-purpose computer systems and applications, other software- or firmware-based systems, such as electronic products and systems employing embedded firmware, may also be developed in a similar manner to that discussed herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive "or", such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. The Abstract is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving a command to update executable software being executed on a computing system from a currently installed version of the executable software to an updated version of the executable software, the updated version of the executable software being a subsequent version to the currently installed version;
    in response to receiving the command, determining, using at least one processor, differences between source code of the currently installed version of the executable software and source code of the updated version of the executable software;

generating, based on the differences between the source code of the currently installed version of the executable software and the source code of the updated version of the executable software, a software update for the currently installed version of the executable software to produce the updated version of the executable software, the software update including modifications to a subset of the source code of the currently installed version of the executable software; and transmitting the software update to the computing system, the computing system performing the modifications to the subset of the source code of the currently installed version of the executable software to update the currently installed version of the executable software to the updated version of the executable software.

2. The method of claim 1, further comprising:

after transmitting the software update to the computing system, receiving a notification from the computing system indicating whether the modifications to the subset of the source code of the currently installed version of the software were implemented on the computing system without a restarting of the currently installed version of the executable software executing on the computing system.

3. The method of claim 2, further comprising:

if the notification indicates that the modifications to the subset of the source code of the currently installed version of the executable software were not implemented, transmitting an instruction to restart the currently installed version of the executable software executing on the computing system to implement the modifications to the subset of the source code that were not previously implemented on the computing system.

4. The method of claim 3, further comprising:

transmitting the software update to a second computing system to update a currently installed version of the executable software executing on the second computing system;

after transmitting the update to the second computing system, receiving a notification from the second computing system indicating whether the software update was implemented to the currently installed version of the executable software executing on the second computing system without a restarting of the currently installed version of the executable software executing on the second computing system; and if the notification indicates that the software update was not implemented to the currently installed version of the executable software executing on the second computing system without a restarting of the currently installed version of the executable software executing on the second computing system, determining a relative order in which to implement the software update on the first computing system and the second computing system, and transmitting, according to the relative order, a second instruction to restart the currently installed version of the executable software executing on the second computing system to implement any portion of the software update that was not previously implemented on the second computing system.

5. The method of claim 3, further comprising:

if the notification indicates that the modifications to the subset of the source code of the currently installed version of the executable software were implemented on the computing system without a restarting of the currently installed version of the executable software executing on the computing system, waiting a predefined period of time; and after waiting the predefined period of time, transmitting the software update to a second computing system to update a currently installed version of the executable software executing on the second computing system.

6. The method of claim 1, wherein the modifications to the subset of source code comprises binary libraries of the updated version of the software, the binary libraries comprising all binary libraries of the updated version of the executable software that are different from corresponding libraries of the currently installed version of the executable software.

7. The method of claim 1, wherein the command is initiated in response to a user input or the updated version of the executable software becoming available.

8. A deployment system comprising:

one or more computer processors; and one or more non-transitory computer-readable mediums storing instructions that, when executed by the one or more computer processors, cause the deployment system to perform operations comprising:

receiving a command to update executable software being executed on a computing system from a currently installed version of the executable software to an updated version of the executable software, the updated version of the executable software being a subsequent version to the currently installed version;

in response to receiving the command, determining, using at least one processor, differences between source code of the currently installed version of the executable software and source code of the updated version of the executable software;

generating, based on the differences between the source code of the currently installed version of the executable software and the source code of the updated version of the executable software, a software update for the currently installed version of the executable software to produce the updated version of the executable software, the software update including modifications to a subset of the source code of the currently installed version of the executable software; and transmitting the software update to the computing system, the computing system performing the modifications to the subset of the source code of the currently installed version of the executable software to update the currently installed version of the executable software to the updated version of the executable software.

9. The deployment system of claim 8, the operations further comprising:

after transmitting the software update to the computing system, receiving a notification from the computing system indicating whether the modifications to the subset of the source code of the currently installed version of the software were implemented on the computing system without a restarting of the currently installed version of the executable software executing on the computing system.

10. The deployment system of claim 9, the operations further comprising:

if the notification indicates that the modifications to the subset of the source code of the currently installed version of the executable software were not implemented, transmitting an instruction to restart the currently installed version of the executable software executing on the computing system to implement the modifications to the subset of the source code that were not previously implemented on the computing system.

11. The deployment system of claim 10, the operations further comprising:
transmitting the software update to a second computing system to update a currently installed version of the executable software executing on the second computing system;
after transmitting the update to the second computing system, receiving a notification from the second computing system indicating whether the software update was implemented to the currently installed version of the executable software executing on the second computing system without a restarting of the currently installed version of the executable software executing on the second computing system; and
if the notification indicates that the software update was not implemented to the currently installed version of the executable software executing on the second computing system without a restarting of the currently installed version of the executable software executing on the second computing system, determining a relative order in which to implement the software update on the first computing system and the second computing system, and transmitting, according to the relative order, a second instruction to restart the currently installed version of the executable software executing on the second computing system to implement any portion of the software update that was not previously implemented on the second computing system.

12. The deployment system of claim 10, the operations further comprising:
if the notification indicates that the modifications to the subset of the source code of the currently installed version of the executable software were implemented on the computing system without a restarting of the currently installed version of the executable software executing on the computing system, waiting a predefined period of time; and
after waiting the predefined period of time, transmitting the software update to a second computing system to update a currently installed version of the executable software executing on the second computing system.

13. The deployment system of claim 8, wherein the modifications to the subset of source code comprises binary libraries of the updated version of the software, the binary libraries comprising all binary libraries of the updated version of the executable software that are different from corresponding libraries of the currently installed version of the executable software.

14. The deployment system of claim 8, wherein the command is initiated in response to a user input or the updated version of the executable software becoming available.

15. A non-transitory computer-readable medium storing instructions that,
when executed by one or more computer processors of a deployment system, cause the deployment system to perform operations comprising:
receiving a command to update executable software being executed on a computing system from a currently installed version of the executable software to an updated version of the executable software, the updated version of the executable software being a subsequent version to the currently installed version;
in response to receiving the command, determining, using at least one processor, differences between source code of the currently installed version of the executable software and source code of the updated version of the executable software;
generating, based on the differences between the source code of the currently installed version of the executable software and the source code of the updated version of the executable software, a software update for the currently installed version of the executable software to produce the updated version of the executable software, the software update including modifications to a subset of the source code of the currently installed version of the executable software; and
transmitting the software update to the computing system, the computing system performing the modifications to the subset of the source code of the currently installed version of the executable software to update the currently installed version of the executable software to the updated version of the executable software.

16. The non-transitory computer-readable medium of claim 15, the operations further comprising:
after transmitting the software update to the computing system, receiving a notification from the computing system indicating whether the modifications to the subset of the source code of the currently installed version of the software were implemented on the computing system without a restarting of the currently installed version of the executable software executing on the computing system.

17. The non-transitory computer-readable medium of claim 16, the operations further comprising:
if the notification indicates that the modifications to the subset of the source code of the currently installed version of the executable software were not implemented, transmitting an instruction to restart the currently installed version of the executable software executing on the computing system to implement the modifications to the subset of the source code that were not previously implemented on the computing system.

18. The non-transitory computer-readable medium of claim 17, the operations further comprising:
transmitting the software update to a second computing system to update a currently installed version of the executable software executing on the second computing system;
after transmitting the update to the second computing system, receiving a notification from the second computing system indicating whether the software update was implemented to the currently installed version of the executable software executing on the second computing system without a restarting of the currently installed version of the executable software executing on the second computing system; and
if the notification indicates that the software update was not implemented to the currently installed version of the executable software executing on the second computing system without a restarting of the currently installed version of the executable software executing on the second computing system, determining a relative order in which to implement the software update on the first computing system and the second computing system, and transmitting, according to the relative order, a second instruction to restart the currently installed version of the executable software executing on the second computing system to implement any portion of the software update that was not previously implemented on the second computing system.

19. The non-transitory computer-readable medium of claim 17, the operations further comprising:
if the notification indicates that the modifications to the subset of the source code of the currently installed version of the executable software were implemented on the computing system without a restarting of the currently installed version of the executable software executing on the computing system, waiting a predefined period of time; and
after waiting the predefined period of time, transmitting the software update to a second computing system to update a currently installed version of the executable software executing on the second computing system.

20. The non-transitory computer-readable medium of claim 15, wherein the modifications to the subset of source code comprises binary libraries of the updated version of the software, the binary libraries comprising all binary libraries of the updated version of the executable software that are different from corresponding libraries of the currently installed version of the executable software.

* * * * *